United States Patent [19]

Masaki

[11] Patent Number: 4,466,736

[45] Date of Patent: Aug. 21, 1984

[54] ORIGINAL PRESSING DEVICE

[75] Inventor: Nobuo Masaki, Tokyo, Japan

[73] Assignee: Canon Kabushiki Kaisha, Tokyo, Japan

[21] Appl. No.: 378,007

[22] Filed: May 13, 1982

[30] Foreign Application Priority Data

May 26, 1981 [JP] Japan .............................. 56-77090[U]

[51] Int. Cl.³ ............................................ G03B 27/62
[52] U.S. Cl. ....................................... 355/75; 355/133
[58] Field of Search ............................ 355/75, 76, 133

[56] References Cited

FOREIGN PATENT DOCUMENTS 2817853 11/1978 Fed. Rep. of Germany ........ 355/75

*Primary Examiner*—Richard A. Wintercorn

*Attorney, Agent, or Firm*—Fitzpatrick, Cella, Harper & Scinto

[57] ABSTRACT

An original pressing device for pressing an original on an original supporting surface by means of an original pressing plate, which device has a plate-like member of synthetic resin, a bending portion formed in the plate-like member, a mounting device provided on one side of the plate-like member with the bending portion as the boundary, the mounting device being for mounting said one side on an original supporting table, an original keeping portion provided on that surface of the plate-like member opposite to the mounted one side, and an abutting portion provided near the bending portion and adapted to be bent and thereby abut with the bending portion to set the angle of bend of the plate-like member, said plate-like member, said bending portion and said abutting portion being formed of a unitary plate-like member of synthetic resin.

6 Claims, 7 Drawing Figures

ORIGINAL PRESSING DEVICE

BACKGROUND OF THE INVENTION

1. Field of the Invention

This invention relates to an original pressing device of an image formation apparatus.

2. Description of the Prior Art

In image formation apparatus including printers, facsimiles and electrophotographic copying apparatus, an original to be copied must be uniformly pressed on an original supporting surface irrespective of the thickness of the original in order to ensure that clear images of good quality are obtained. For this reason, the original pressing device according to the prior art is of such a construction as shown in FIG. 1 of the accompanying drawings wherein an elongate arm 4 is associated with a hinge 3 provided on an original supporting surface 2 and the arm 4 is passed through a hole 6 formed in a copying apparatus body 5 so that the hinge 3 is rockable up and down. With such construction, if an original pressing plate 1 is opened and closed by gripping a handle H, even a thick original 7 such as a book or the like can be relatively uniformly brought into contact with the original supporting surface 2. However, the original pressing plate 1 is of a construction in which the hinge 3 and the arm 4 are made integral with each other and this leads to compexity and high cost of the device and sometimes, sliding movement of the hinge 3 and arm 4 has produced noise which has also been offensive to the ear.

FIG. 2 of the accompanying drawings is a side cross-sectional view of another conventional original pressing plate disclosed in U.S. Pat. No. 4,157,222. This original pressing plate 1' comprises a flat core number 8 sandwiched between sheet-like members 9, the core member being cut at two locations near a mounting portion 10 for mounting the original pressing plate to a copying apparatus body 5, the upper and lower sheet members being joined together at said locations to form hinges B and C. Accordingly, this original pressing plate can press even a thick original 7 as shown in FIG. 2, but the joined hinge portions B and C are liable to peel off and further, this original pressing plate does not have the holding functions in a predetermined degree of opening during opening-closing of the original pressing plate 1' and therefore, the operator must always hold down the original pressing plate 1' or a support 11 must be secured to the mounting portion 10 side and thus, this original pressing plate has required a number of parts which in turn has led to problems of manufacturing cost and operability.

SUMMARY OF THE INVENTION

It is an object of the present invention to provide an original pressing device provided with an original pressing plate which is low in manufacturing cost and good in operability.

it is another object of the present invention to provide an original pressing device which is capable of uniformly pressing an original on an original supporting surface irrespective of the thickness of the original.

It is still another object of the present invention to provide an original pressing device in which the original pressing plate has a self-supporting ability.

It is yet still another object of the present invention to provide an original pressing device in which the original pressing plate can be opened and closed without producing abnormal sound and which is inexpensive.

The above objects and achieved by an original pressing device having a plate-like member of synthetic resin, a bending portion formed in said plate-like member, a mounting means provided on one side of said plate-like member with said bending portion as the boundary, said mounting means being for mounting said one side on an original supporting table, an original keeping portion provided on that surface of said plate-like member opposite to said mounted one side, and an abutting portion provided near said bending portion and adapted to be bent and thereby abut with said bending portion to set the angle of bend of said plate-like member.

The invention will become more fully apparent from the following detailed description thereof taken in conjunction with the accompanying drawings.

DESCRIPTION OF THE PREFERRED EMBODIMENTS

Figure 1:
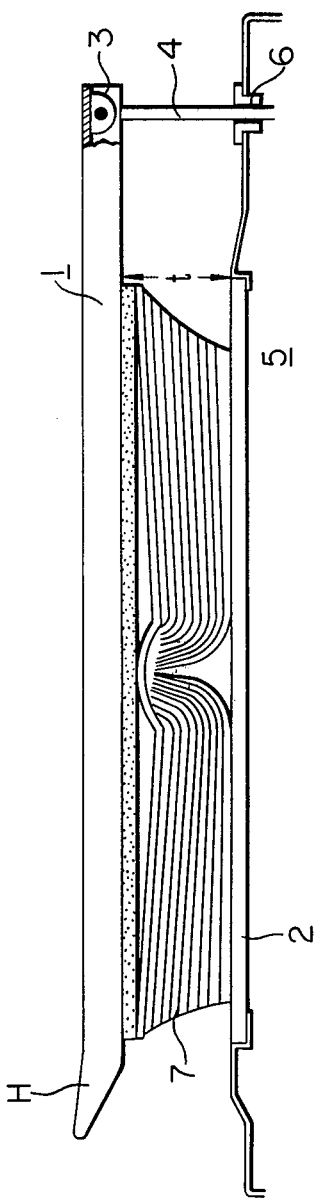
FIG. 1 is a side cross-sectional view of an original pressing plate according to the prior art.
Figure 2:
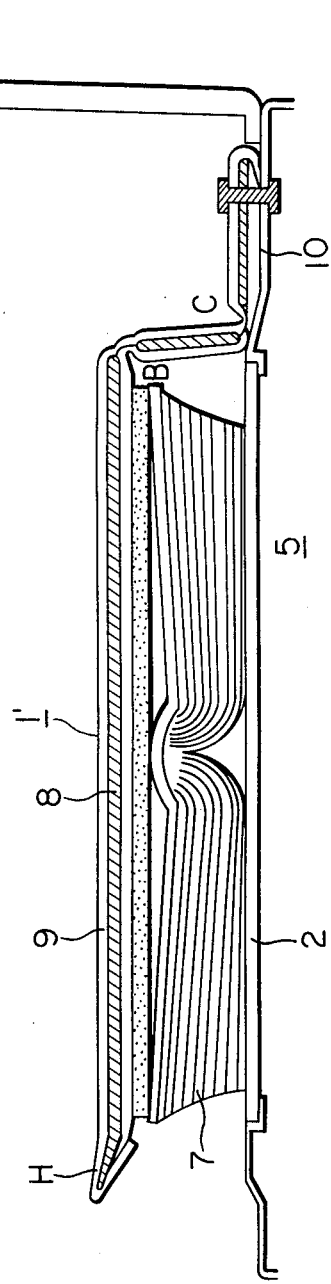
FIG. 2 is a side cross-sectional view of another original pressing plate according to the prior art.
Figure 3:
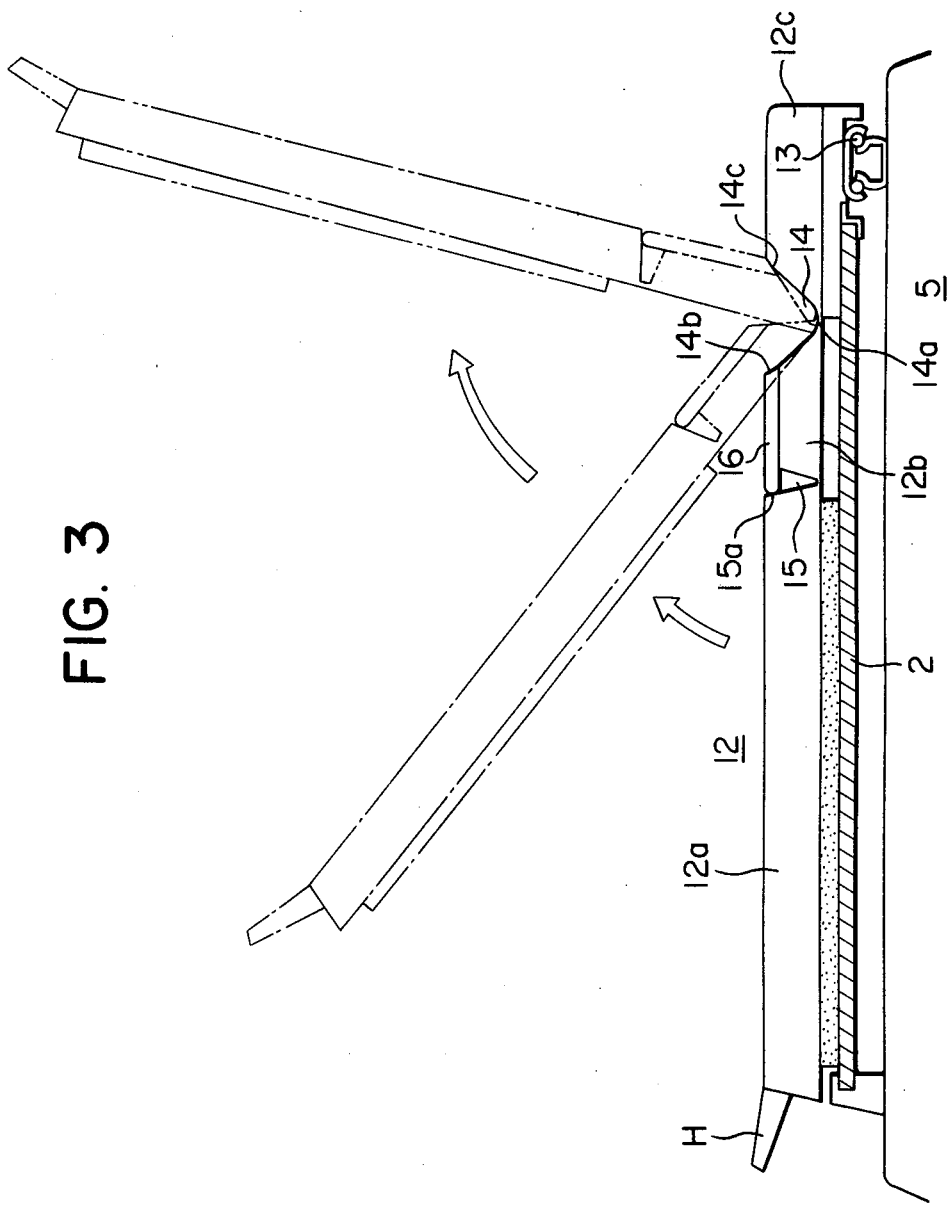
FIG. 3 is a side cross-sectional view of an original pressing plate showing an embodiment of the present invention.

Referring to FIG. 3, there is shown an original pressing device according to a first embodiment of the present invention. An original pressing plate 12 comprises three areas, namely, a pressing portion 12a for pressing an original, a mounting portion 12c for mounting the pressing plate to a copying apparatus body, and an intermediate portion 12b between said two portions. The body of the original pressing plate 12 is integrally formed of a high molecular resin material such as polypropylene which is not broken in a thin layer state and which is bendable. The mounting portion 12c is provided on the body 5 through an accuride rail 13. A slit-like groove 14 of substantially V-shaped cross-section is formed between the mounting portion 12c and the intermediate portion 12b, and in case of polypropylene, 0.1–0.5 mm has been optimum as the thickness 14a of the bottom portion thereof. A groove 15 of substantially V-shaped cross-section is also formed between the intermediate portion 12b and the pressing portion 12a, and the thickness of the bottom portion thereof is about 0.1–0.5 mm. High molecular resin such as polypropylene or soft polyethylene has a bending strength in its state of great thickness and is not simply bendable. However, it is very simply bendable in its state of small thickness and moreover, it is free of the possibility that the bent portion thereof is broken for repeated bending operation. Accordingly, the V- shaped grooves 14 and 15 perform the function of pivotable hinges without having a mechanical sliding portion and the intermediate portion 12b and the pressing portion 12a of the original pressing plate 12 can be quietly opened and closed relative to the mounting portion 12c.

In FIG. 3, the position indicated by dots-and-dash lines is the position in which the original pressing plate is self-supporting. As already described, the V-shaped groove 14 functions as pivot, but as the original pressing plate is opened, the upper edge 14b of the V-shaped groove 14 which is adjacent to the intermediate portion 12b comes to bear against the upper edge 14c of the groove 14 which is adjacent to the mounting portion 12c and therefore, the V-shaped groove 14 can control further opening of the original pressing plate and thus it also has the function of causing the original pressing plate to self-support as shown in FIG. 3. Accordingly, as a matter of course, the self-support angle of the original pressing plate can be set by varying the angle of V of the substantially V-shaped groove.

Figure 7:
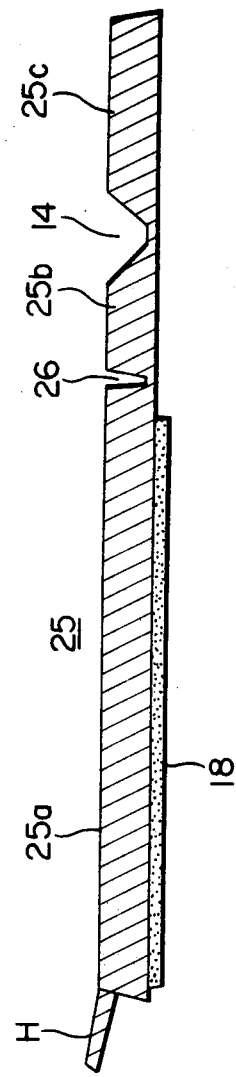
FIG. 7 is a side cross-sectional view of an original pressing plate showing a third embodiment of the present invention.

On the other hand, a lock plate 16 is provided on the upper portion of the substantially V-shaped groove in the intermediate portion 12b. The fore end of the lock plate 16 comes into contact with the upper edge of the pressing portion 12a when the intermediate portion 12b and the pressing portion 12a are insubstantially planar condition. Thus, even if the original pressing plate is opened, the intermediate portion 12b and the pressing portion 12a can self-support as shown in FIG. 3 while keeping their planar condition. Of course, the lock plate need not always be provided but a mere groove similar to the substantially V-shaped groove 14 may be provided (FIG. 7). By varying the width of the groove at this time, the angle of opening of the pressing portion 12a relative to the intermediate portion 12b can be varied.

In FIG. 3, the position indicated by dot-and-dash line (---) is the position in the course of opening of the original pressing plate.

Figure 4:
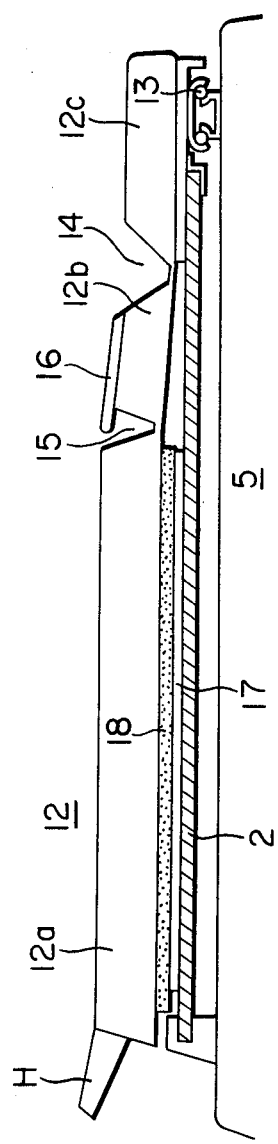
FIG. 4 is a side cross-sectional view of the original pressing plate according to the first embodiment which presses a thin original.

A thin original 17 is uniformly pressed on an original supporting surface 2 through an elastic member 18 provided under the pressing portion 12a (FIG. 4).

Figure 5:
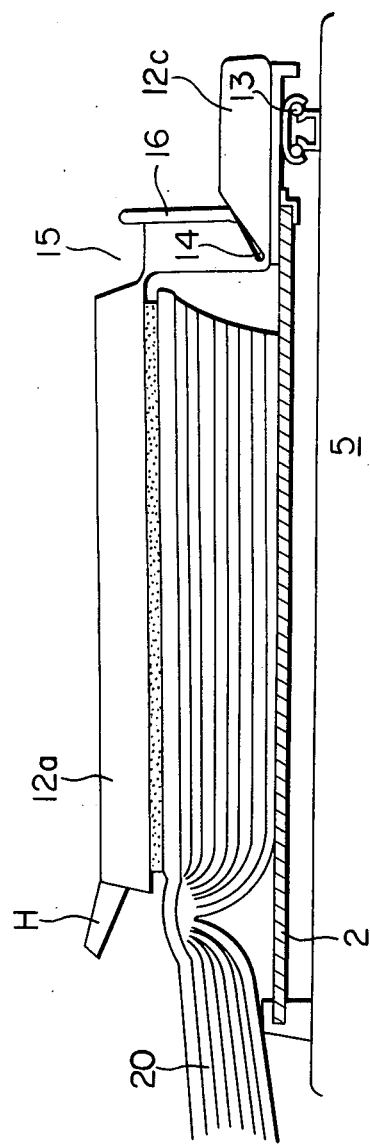
FIG. 5 is a side-sectional view of the original pressing plate according to the first embodiment which presses a thick original.

FIG. 5 shows a condition in which a thick original 20 such as a book or the like is pressed. In case of the thick original 20, the intermediate portion 12b can bend on the opposite side with the aid of the grooves 14 and 15 in accordance with the thickness of the original, and the pressing portion can be caused to uniformly face the upper surface of the thick original and press the thick original on the original supporting surface.

Figure 6:
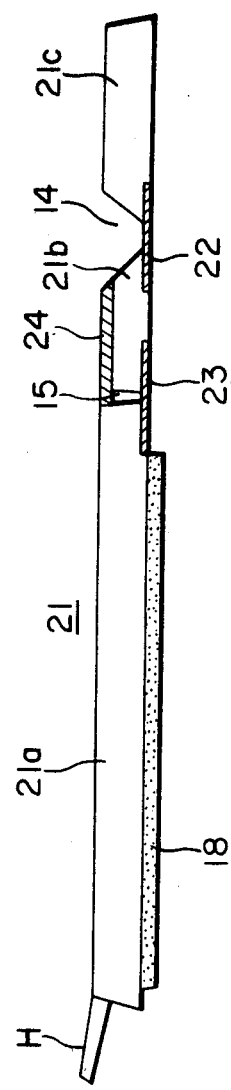
FIG. 6 is a side cross-sectional view of an original pressing plate showing a second embodiment of the present invention.

FIG. 6 shows a second embodiment of the present invention. Members 22 and 23 of different material from the body (pressing portion 21a, intermediate portion 21b and mounting portion 21c) of an original pressing plate 21 are used in V-shaped grooves 14, 15 and lock plate. As a matter of course, the pressing portion 21a, the intermediate portion 21b and the mounting portion 21c may be formed of different materials, but at least the hinge portions of the V-shaped grooves should be formed of a material which will not be broken even if repetitively bent.

FIG. 7 shows a third embodiment of the present invention. The hinge portion of the mounting portion 25c and intermediate portion 25b of an original pressing plate 25 is a substantially V-shaped groove, while the hinge portion between the intermediate portion 25b and the pressing portion 25a is a groove of substantially U-shaped cross-section.

This original pressing plate 25, except for the elastic member 18, is integrally formed of a plate-like member. The hinges 14 and 26 are simple grooves and therefore, the original pressing plate can be simply manufactured by pressing a plate-like member or by placing thermoplastic resin into a mold of the original pressing plate and this leads to a great reduction in cost.

What I claim is:

1. An original pressing device comprising:
   an original pressing plate having a mounting portion, an intermediate portion and a pressing portion;
   a first bending portion provided between said mounting portion and said intermediate portion;
   a second bending portion provided between said intermediate portion and said pressing portion;
   mounting means for mounting said mounting portion on an original supporting table;
   first abutting portions located on the facing sides of said intermediate portion and said mounting portion near said first bending portion to control the opening angle of said intermediate portion relative to said mounting portion through said first bending portion and to cause said intermediate portion to self-support in the open position; and
   second abutting portions located on the facing sides of said pressing portion and said intermediate portion near said second bending portion to control the opening angle of said pressing portion relative to said intermediate portion through said second bending portion and to cause this pressing portion to self-support in the open position;
   wherein at the time of self-support, the angle between said intermediate portion and said mounting portion, as viewed from their abutting side, is smaller than the angle between said pressing member and said intermediate portion, as viewed from their abutting side.

2. An original pressing device according to claim 1, wherein a groove is formed between each pair of adjacent faces of said pressing plate portions and said abutting portions are provided at the mutually opposed upper edges of the associated groove, the width of the groove between said mounting portion and said intermediate portion being wider than the groove located between said intermediate portion and said pressing portion.

3. An original pressing device according to claim 1, wherein a groove is formed between each pair of adjacent faces of said pressing plate portions, and said first abutting portions are provided at the mutually opposed upper edges of the associated groove, and at least one of said second abutting portions is a lock means provided at the upper portion of the associated groove, the clearance between said second abutting portions being nearly equal to zero.

4. An original pressing device according to claim 1, 2 or 3, wherein said original pressing plate and bending portions are formed of common material and are of unitary construction.

5. An original pressing device according to claim 1, 2 or 3, wherein said original pressing plate, bending portions and abutting portions are formed of common material and are of unitary construction.

6. An original pressing device according to claim 1, 2 or 3, wherein said bending portions are formed of a material different from the material of the pressing plate portions but said pressing plate and bending portions are integrally formed.

* * * * *